United States Patent
Chung

(10) Patent No.: US 6,628,963 B1
(45) Date of Patent: Sep. 30, 2003

(54) PORTABLE MULTIMEDIA PLAYER

(75) Inventor: Goo-Hyoung Chung, Seoul (KR)

(73) Assignee: Dasan Information and Communication Co., Ltd., Seoul (KR)

(*) Notice: Subject to any disclaimer, the term of this patent is extended or adjusted under 35 U.S.C. 154(b) by 589 days.

(21) Appl. No.: 09/592,527

(22) Filed: Jun. 12, 2000

(30) Foreign Application Priority Data

Aug. 19, 1999 (KR) ........................................ 1999-34266

(51) Int. Cl.[7] .............................................. G06F 13/00
(52) U.S. Cl. ......................... 455/556; 709/250; 700/94
(58) Field of Search .................... 709/250; 455/556; 700/94

(56) References Cited

U.S. PATENT DOCUMENTS

| | | | | | |
|---|---|---|---|---|---|
| 6,007,228 | A | * | 12/1999 | Agarwal et al. | 700/94 |
| 6,219,227 | B1 | * | 4/2001 | Trane | 361/683 |
| 6,266,539 | B1 | * | 7/2001 | Pardo | 455/556 |
| 6,359,892 | B1 | * | 3/2002 | Szlam | 370/401 |
| 6,378,077 | B1 | * | 4/2002 | Atkinson | 713/324 |
| 6,421,235 | B2 | * | 7/2002 | Ditzik | 361/683 |
| 6,423,892 | B1 | * | 7/2002 | Ramaswamy | 84/609 |

* cited by examiner

Primary Examiner—Kenneth R. Coulter
(74) Attorney, Agent, or Firm—Lee & Hong

(57) ABSTRACT

Disclosed is a portable multimedia player comprising: a portable phone section having a modem adapted to communicate with an external device; a multimedia control section adapted to perform a control of the overall operation of the portable multimedia player and including a CPU, a control logic circuit, a memory having a predetermined storage capacity and adapted to store a music file and a moving picture file downloaded by way of online communications, and a system ROM adapted to store predetermined control program; a CD player section adapted to drive a CD-ROM driver to reproduce a CD media; a key input section having a plurality of function keys and adapted to input a control signal for controlling each of the elements of the portable multimedia player; a MPEG data processing section adapted to process a MPEG-1 video signal and a MP3 audio signal from a file stored in the CD player section or the multimedia control section and to convert the MP3 audio digital signal into an analog signal to output the converted signal to the outside; a image outputting section adapted to display a video signal applied thereto from the MPEG data processing section and multimedia information of current status on a LCD screen; and an audio codec mixing section adapted to output the audio signal applied from the MPEG data processing section as a stereo audio signal to the outside through a voice outputting section.

2 Claims, 3 Drawing Sheets

PORTABLE MULTIMEDIA PLAYER

BACKGROUND OF THE INVENTION

1. Field of the Invention

The present invention relates to a multimedia player, and more particularly to a portable multimedia player that can reproduce a music file and a moving picture file, and can download a variety of files by way of online communications, store them therein, and reproduce them therefrom with it being connected to a portable phone, or along with a serial port or a parallel port thereof.

2. Description of the Related Art

Currently, although diverse functions are added to a computer system to build a multimedia environment, such a multimedia environment is not yet built perfectly, and a general user has somewhat difficulty in building it. Also, when it is desired to connect a television set, a computer, a CD player, a communication device, etc. to each other, large space is required and it is very complicated to connect them to each other.

SUMMARY OF THE INVENTION

Therefore, the present invention has been made in view of the above-mentioned problems, and it is an object of the present invention to provide a portable multimedia player that can perform integrally a communication function, and functions of a CD player, a video cassette recorder (VCR), and a radio, etc.

According to an aspect of the present invention, there is provided a method for a portable multimedia player comprising: a portable phone section having a modem adapted to communicate with an external device; a multimedia control section adapted to perform a control of the overall operation of the portable multimedia player, the multimedia control section including a CPU, a control logic circuit, a memory having a predetermined storage capacity and adapted to store a music file and a moving picture file downloaded by way of online communications, and a system ROM adapted to store predetermined control program; a CD player section adapted to drive a CD-ROM driver to reproduce a CD media; a key input section having a plurality of function keys and adapted to input a control signal for controlling each of the elements of the portable multimedia player; a MPEG data processing section adapted to process a MPEG-1 video signal and a MP3 audio signal from a file stored in the CD player section or the multimedia control section and to convert the MP3 audio digital signal into an analog signal to output the converted signal to the outside; a image outputting section adapted to display a video signal applied thereto from the MPEG data processing section and multimedia information of current status on a LCD screen; and an audio codec mixing section adapted to output the audio signal applied from the MPEG data processing section as a stereo audio signal to the outside through a voice outputting section.

Preferably, the portable multimedia player further includes external devices such as a monitor, a speaker, a keyboard, a joystick, etc., a signal input/output section adapted to input/output a signal to/from the portable multimedia player and having a serial port and a parallel port, or an audio port and a video port, the serial port and the parallel port, or the audio port and the video port being connected to the external devices, and a radio section, selectively.

Further, diverse functions such as an electronic pocketbook, a repeat playback and a partly selective playback, etc., of audio equipment and video equipment, as well as a typical alarm function and a voice recording function can be added integrally to one multimedia player.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in detail to the preferred embodiments of the present invention.

Figure 1:
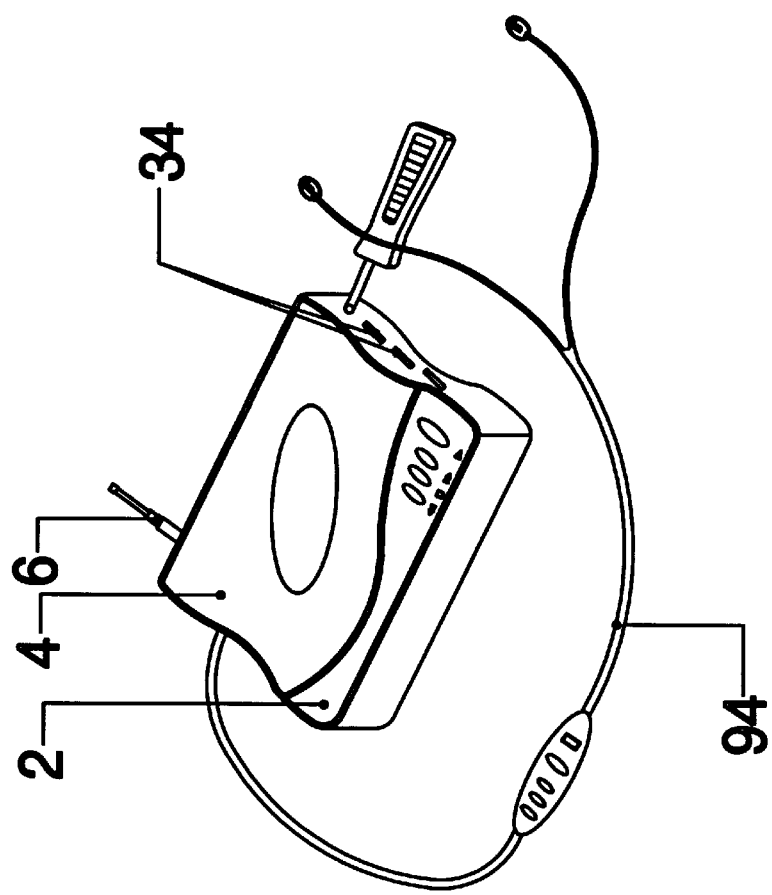
FIGS. 1 and 2 are perspective views illustrating appearances of a portable multimedia player according to the present invention, respectively.
Figure 2:
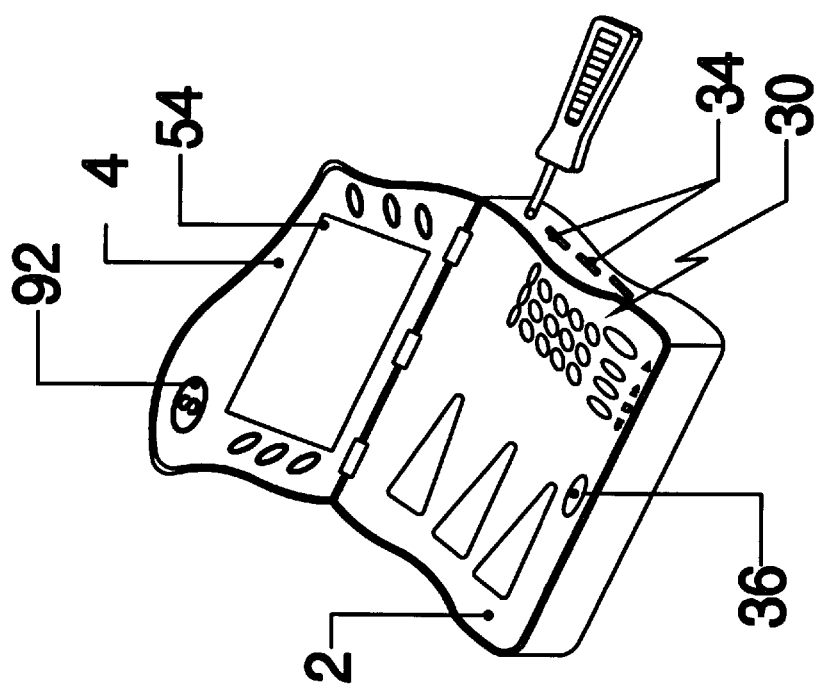

FIGS. 1 and 2 are perspective views illustrating appearances of a portable multimedia player according to the present invention, respectively, wherein FIG. 1 is a perspective view illustrating a non-operatable state in which a cover thereof is closed, and FIG. 2 is a perspective view illustrating an operatable state in which a cover thereof is opened.

As shown in FIGS. 1 and 2, the portable multimedia player is included in a casing 2 such as a conventional portable CD player. A key input section 30 consisting of a variety of numeral keys and function keys is disposed on the casing 2, and a speaker 92 and LCD display screen 54 are disposed on the interior surface of a cover 4 covering an audio mixing section 36 of the casing 2. A reference numeral 6 denotes a radio-receiving antenna.

Figure 3:
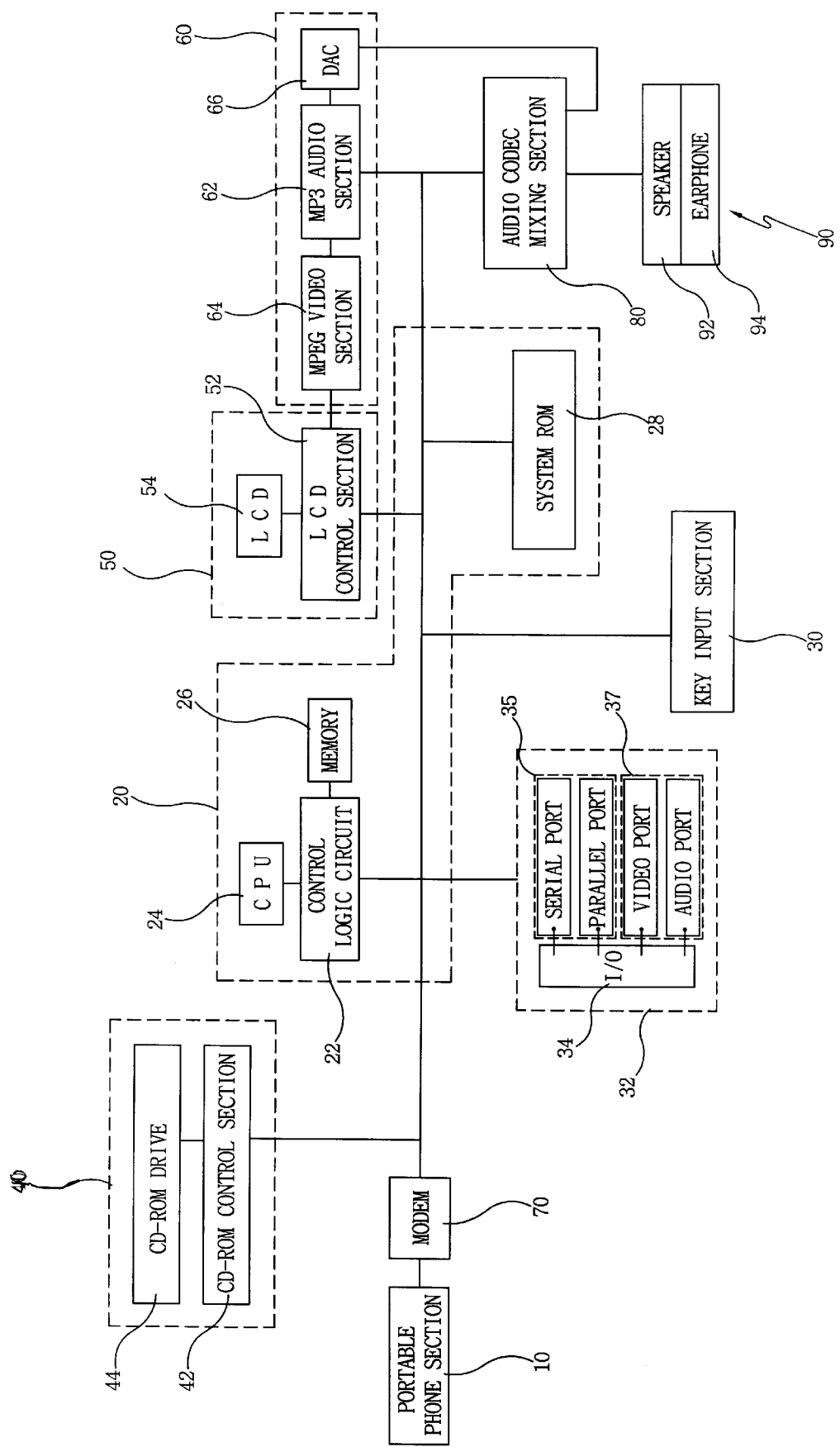
FIG. 3 is a block diagram illustrating the inner construction of the portable multimedia player according to the present invention.

FIG. 3 is a block diagram illustrating the inner construction of the portable multimedia player according to the present invention.

Referring to FIG. 3, there is shown each of the circuit constructions of the portable multimedia player of the present invention. A portable phone section 10 may be connected to a conventional portable phone. The key input section 30 can be configured to input different functions of multimedia together. A modem 70 is added to the portable multimedia player to communicate with external equipment. Further, the LCD display screen 54 may enable use of an Internet web surfing, a home shopping, a home banking, etc. as well as performance of a function of a visual telephone.

A multimedia control section 20, which controls the overall operation of the portable multimedia player, includes a CPU 24, a general control logic circuit 22, a memory 26, and a system ROM 28. Control program stored in the system ROM 28 controls both the overall operation of the portable multimedia player and performs a general communication function through the portable phone section 10. The memory 26 may be one of a flash memory, a multimedia memory card (MMC), a smart memory, card (SMC), etc., and is used as a location for temporarily storing MP3 files, etc. downloaded by way of online communications.

The MMC and SMC are configured to be detachably mounted to the portable multimedia player.

A CD player 40, which includes a CD-ROM driver 44 and a CD-ROM controller, reproduces diverse types of CD media.

A MPEG data processor 60, which includes an MPEG video section 64 and an MPEG audio section 62, processes an audio signal and a video signal according to a reproduction of a moving picture. An audio data outputted from the MP3 section 62 is applied to a digital-analog converter (DAC) 66 which converts the applied audio signal into an analog signal. The digital-analog converter (DAC) 66 supplies the converted signal to an audio codec mixing section 80, and then, a voice outputting section 90 which outputs a stereo audio signal to the outside. The audio codec mixing section 80 may be configured selectively. The outputted stereo audio signal is reproduced by the voice outputting section 90 such as a speaker 92 or a earphone 94, etc.

In addition, an external device is connected to an input/output section 32 for inputting and outputting various signals so that audio and video data can be reproduced through an external amplifier, etc.

Meanwhile, an image outputting section 50 includes a LCD control section 52 and a LCD 54, which controls a signal outputted from the MPEG video section to output images while displaying the current status of multimedia.

The input/output section 32 includes serial and parallel ports 35, and audio and video ports 37. For example, an external device such as a computer, etc. can be connected to the serial and parallel ports 35, and the external device can be connected to the audio and video ports 37 to output video and audio data. Such an inputting and outputting of the video and audio data is controlled by an I/O interface 34.

The key input section 30, which includes a plurality of buttons, functions as a function key for multimedia. Instead of these buttons, a keyboard, a mouse, a joystick, etc. that can be connected to the input/output section 32 may be used.

As can be seen from the foregoing, the present invention has advantages in that audio equipment, video equipment, an electronic pocketbook, an alarm, a communication device, a voice recorder are integrated in function by one multimedia player, so that it is possible to eliminate an inconvenience for a user to have to carry all the devices having different functions.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A portable multimedia player comprising:

a portable phone section having a modem adapted to communicate with an external device;

a multimedia control section adapted to perform a control of the overall operation of the portable multimedia player, the multimedia control section including a CPU, a control logic circuit, a memory having a predetermined storage capacity and adapted to store a music file and a moving picture file downloaded by way of online communications, and a system ROM adapted to store predetermined control program;

a CD player section adapted to drive a CD-ROM driver to reproduce a CD media;

a key input section having a plurality of function keys and adapted to input a control signal for controlling each of the elements of the portable multimedia player;

a MPEG data processing section adapted to process a MPEG-1 video signal and a MP3 audio signal from a file stored in the CD player section or the multimedia control section and to convert the MP3 audio digital signal into an analog signal to output the converted signal to the outside;

a image outputting section adapted to display a video signal applied thereto from the MPEG data processing section and multimedia information of current status on a LCD screen; and an audio codec mixing section adapted to output the audio signal applied from the MPEG data processing section as a stereo audio signal to the outside through a voice outputting section.

2. The portable multimedia player according to claim 1 further comprising external devices, a signal input/output section adapted to input/output a signal to/from the portable multimedia player and having a serial port and a parallel port, or an audio port and a video port, the serial port and the parallel port, or the audio port and the video port being connected to the external devices, and a radio section, selectively.

\* \* \* \* \*